(12) United States Patent
Rönneke et al.

(10) Patent No.: US 8,675,489 B2
(45) Date of Patent: Mar. 18, 2014

(54) DEVICE FOR LOW PRIORITY HANDLING

(75) Inventors: Hans Rönneke, Kungsbacka (SE); Rikard Eriksson, Jörlanda (SE); Louis Segura, Saint-Laurent (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 387 days.

(21) Appl. No.: 12/981,725

(22) Filed: Dec. 30, 2010

(65) Prior Publication Data

US 2011/0268026 A1 Nov. 3, 2011

Related U.S. Application Data

(60) Provisional application No. 61/329,774, filed on Apr. 30, 2010, provisional application No. 61/329,645, filed on Apr. 30, 2010.

(51) Int. Cl.
*G08C 15/00* (2006.01)

(52) U.S. Cl.
USPC .................. 370/235; 370/395.21; 370/395.42

(58) Field of Classification Search
USPC .............. 370/229, 230, 230.1, 231, 235, 310, 370/328, 351, 389, 395.1, 395.2, 395.21, 370/395.4, 395.42; 455/403, 422.1, 435.1, 455/435.2, 435.3, 39, 500, 507, 509, 512
See application file for complete search history.

(56) References Cited

U.S. PATENT DOCUMENTS

| | | | |
|---|---|---|---|
| 6,295,284 B1 | 9/2001 | Maggenti | |
| 2002/0110123 A1 | 8/2002 | Shitama | |
| 2006/0126547 A1 | 6/2006 | Puuskari et al. | |
| 2007/0184842 A1 | 8/2007 | Pedersen et al. | |
| 2010/0070817 A1* | 3/2010 | Heise | 714/749 |
| 2010/0157959 A1* | 6/2010 | Hiben et al. | 370/337 |
| 2010/0226252 A1* | 9/2010 | Gogic et al. | 370/236 |
| 2011/0098020 A1 | 4/2011 | Van Loon et al. | |
| 2011/0199901 A1 | 8/2011 | Kavanaugh et al. | |
| 2011/0199905 A1 | 8/2011 | Pinheiro et al. | |
| 2011/0274040 A1 | 11/2011 | Pani et al. | |
| 2011/0292893 A1 | 12/2011 | Lee et al. | |
| 2012/0033613 A1 | 2/2012 | Lin et al. | |
| 2012/0039171 A1 | 2/2012 | Yamada et al. | |
| 2013/0034059 A1* | 2/2013 | Lee et al. | 370/328 |
| 2013/0040678 A1* | 2/2013 | Lee et al. | 455/509 |
| 2013/0051228 A1* | 2/2013 | Kim et al. | 370/230 |

OTHER PUBLICATIONS

Office Action issued in U.S. Appl. No. 12/981,686 dated Nov. 13, 2012.
U.S. Appl. No. 12/981,666, filed Dec. 30, 2010, entitled "Devices for Congestion Control."
U.S. Appl. No. 12/981,686, filed Dec. 30, 2010, entitled "Communication Schedule".
U.S. Appl. No. 12/981,666, filed Dec. 30, 2010; Inventor: Ronneke et al.

(Continued)

*Primary Examiner* — Obaidul Huq
(74) *Attorney, Agent, or Firm* — Nixon & Vanderhye, P.C.

(57) ABSTRACT

The embodiments herein relates to a method in a transceiver (110) for enabling traffic you prioritizing in a wireless communication system (100). The transceiver (110) is configured to transmit traffic to a first communication node (101, 120). The transceiver (110) transmits a message to the first communication node (101, 120). The message comprises an indicator indicating that the transmitted traffic tolerates a delay, enabling traffic prioritizing in the wireless communication system (100).

8 Claims, 7 Drawing Sheets

(56) References Cited

OTHER PUBLICATIONS

U.S. Appl. No. 12/981,725, filed Dec. 30, 2010; Inventor: Ronneke et al.
Office Action mailed Jun. 18, 2012 in U.S. Appl. No. 12/981,686.
Office Action mailed Mar. 19, 2012 in U.S. Appl. No. 12/981,666.
Notification of Transmittal of International Search Report and Written Opinion for International Application No. PCT/EP2010/070913 mailed Mar. 31, 2011.
LTE, Evolved Universal Terrestrial Radio Access (E-UTRA); Radio Resource Control (RRC); Protocol Specification (3GPP TS 136.331 version 8.9.0 Release 8); Apr. 1, 2010, XP014046912.
3$^{rd}$ Generation Partnership Project; Technical Specification Group Services and System Aspects; Service Requirements for Machine-Type Communications (MTC); Stage 1 (Release 10); 3GPP TS 22.368 V10.0.0; Mar. 1, 2010, XP007917753.
3$^{rd}$ Generation Partnership Project; Technical Specification Group Services and System Aspects; System Improvements for Machine-Type Communications, (Release 10); 3GPP TR 23.888V0.3.2; Mar. 1, 2010, XP007917755.
3$^{rd}$ Generation Partnership Project; Technical Specification Group Services and System Aspects; General Packet Radio Service (GPRS) Enhancement for Evolved Universal Terrestrial Radio Access Network (E-UTRAN) access (Release 10), 3GPP TS 23.401 V10.2.0, Dec. 1, 2010, XP007917754.
Written Opinion mailed May 15, 2012 in Application No. PCT/EP2010/070913.
3GPP TR 23.898 V7.0.0, Technical Report "3$^{rd}$ Generation Partnership Project; Technical Specification Group Services and System Aspects; Access Class Barring and Overload Protection; (Release 7)", Mar. 2005; XP002473887.
Office Action issued in Application U.S. Appl. No. 12/981,666 dated Oct. 17, 2012.
3GPP TR 23.898 V7.0.0, Technical Report "3$^{rd}$ Generation Partnership Project; Technical Specification Group Services and System Aspects; Access Class Barring and Overload Protection; (Release 7)," Mar. 2005 XP002473887.

\* cited by examiner

DEVICE FOR LOW PRIORITY HANDLING

CROSS-REFERENCE

This application claims the benefit of Provisional Application Nos. 61/329,774 filed Apr. 30, 2010 and 61/329,645 filed Apr. 30, 2010, the entire contents of which are hereby incorporated by reference herein.

TECHNICAL FIELD

The embodiments herein disclose an improved transceiver and node in wireless communications systems for handling of low priority traffic.

BACKGROUND

In a typical cellular communication system, also referred to as a wireless communications network, wireless terminals, also known as mobile stations and/or User Equipment units (UEs) communicate via Radio Access Networks (RAN) to a Core Network (CN). The wireless terminals may be mobile stations or user equipments such as mobile telephones also known as cellular telephones, laptops with wireless capability, and thus may be, for example, portable, pocket, hand-held, computer-included, or car-mounted mobile devices which communicate voice and/or data with radio access network. The wireless terminals may also be communication devices or modules that are part of other electronic equipments such as video or photographic camera equipment, electronic photo frames, cardiac surveillance equipment, intrusion or other surveillance equipment, weather data monitoring systems, car or transport communication equipment, etc.

The radio access network is the network that is located between the wireless terminals, and the core network. RAN provides radio bearers between the core network and the wireless terminals for the transport of data and signaling, thus enabling wireless terminals to access services offered e.g. by Internet. The main RAN function includes establishment, maintenance, and termination of radio channels; radio resource management; and mobility management. The radio access network covers a geographical area which is divided into cell areas, with each cell area being served by a base station, e.g. a Radio Base Station (RBS), which in some radio access networks is also called evolved NodeB (eNB), NodeB, B node or base station. A cell is a geographical area where radio coverage is provided by the radio base station at a base station site. Each cell is identified by an identity within the local radio area, which is broadcast in the cell. The base stations communicate over the air interface operating on radio frequencies with the user equipments within range of the base stations.

In some versions of the radio access network, several base stations are typically connected, e.g. by landlines or microwave, to a Radio Network Controller (RNC), as in $3^{rd}$ Generation (3G), i.e. Wideband Code Division Multiple Access (WCDMA). The radio network controller supervises and coordinates various activities of the plural base stations connected thereto. In $2^{nd}$ Generation (2G), i.e. Global System for Mobile communication (GSM), the base stations are connected to a Base Station Controller (BSC). The network controllers are typically connected to one or more core networks.

Machine-to-Machine (M2M) is a term referring to technologies that allow both wireless and wired systems to communicate with other devices of the same ability, for example computers, embedded processors, smart sensors, actuators and mobile devices may communicate with one another, take measurements and make decisions, often without human intervention The Machine to Machine traffic, "M2M" traffic, is becoming increasingly common in wireless communication systems, such as GSM, WCDMA and Long Term Evolution (LTE). M2M traffic is, for example, used in such diverse applications as electricity meters, home alarms, signaling from vehicles, such as cars, trucks etc.

A problem in this context is that the number of users of wireless systems will grow greatly, which will create a need for avoiding congestion. For example if all electricity meters in an area attempt to report their readings to a central or collecting server at one and the same time, and that point in time happens to be at rush hour for other users, for example at 5 o'clock in the afternoon, there will be a problem with congestion and overload of the system. Congestion and overload affects all users of the system, both machines and human users.

SUMMARY

The objective of embodiments herein is therefore to obviate at least one of the above disadvantages and to provide a solution to the problem of congestion and overload caused by Machine to Machine traffic.

According to a first aspect, the objective is achieved by a method in a transceiver for enabling traffic prioritizing in a wireless communication system. The transceiver is configured to transmit traffic to a first communication node. The transceiver transmits a message to the first communication node. The message comprises an indicator indicating that the transmitted traffic tolerates a delay, enabling traffic prioritizing in the wireless communication system 100.

According to a second aspect, the objective is achieved by a method in first communication node for enabling traffic prioritizing in a wireless communications system. The first communication node is configured to receive traffic from a transceiver. The first communication node receives a message from the transceiver. The message comprises an indicator indicating that the received traffic tolerates a delay, enabling traffic prioritizing in the wireless communication system.

According to a third aspect, the objective is achieved by a transceiver for enabling traffic prioritizing a wireless communications system. The transceiver comprises a transmitting unit configured to transmit traffic to a first communication node, and to transmit a message to the first communication node. The message comprises an indicator indicating that the transmitted traffic tolerates a delay, enabling traffic prioritizing in the wireless communication system.

According to a fourth aspect, the objective is achieved by a first communication node for enabling traffic prioritizing in a wireless communication system. The first communication node is configured to receive traffic from a transceiver. The first communication node comprises a receiving unit configured to receive a message from the transceiver. The message comprises an indicator indicating that the received traffic tolerates a delay, enabling traffic prioritizing in the wireless communication system.

The embodiments herein afford many advantages, for which a non-exhaustive list of examples follows:

An advantage of the embodiments herein is that the delay tolerant indicator makes it possible to provide an intelligent request selection of requests which does not affect Human To Human communication (H2H).

Another advantage is that Machine to Machine communication considered as delay tolerant does not create congestion and overload. The delay indicator provides a protection mechanism for the network.

The delay tolerant indicator also provides an early detection and protection mechanism for the communication system, e.g. RAN, Core network. As the delay tolerant indicator is sent by the device it provides the means for an early detection mechanism in the communication system, e.g. RAN, Core network, of delay tolerant traffic such that in an already congested or overloaded communication system no further load is induced, e.g. signaling to other nodes, security authentication, to determine the relative priority of the request.

Another advantage is that delay tolerant indicator makes it possible to provide an intelligent request selection of requests made by varying M2M applications with differing delay tolerant characteristics.

A further advantage is that dimensioning of mobile networks becomes easier as traffic peaks caused by delay tolerant traffic need not be dimensioned for, but may be handled by the congestion and overload control mechanism provided by the delay indicator instead.

Another advantage is that mobile operators may differentiate their subscriptions and offer lower cost subscriptions for delay tolerant purposes such as Machine to Machine communication.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will be described in more detail in the following, with reference to the appended drawings, in which.

DETAILED DESCRIPTION

Figure 1:
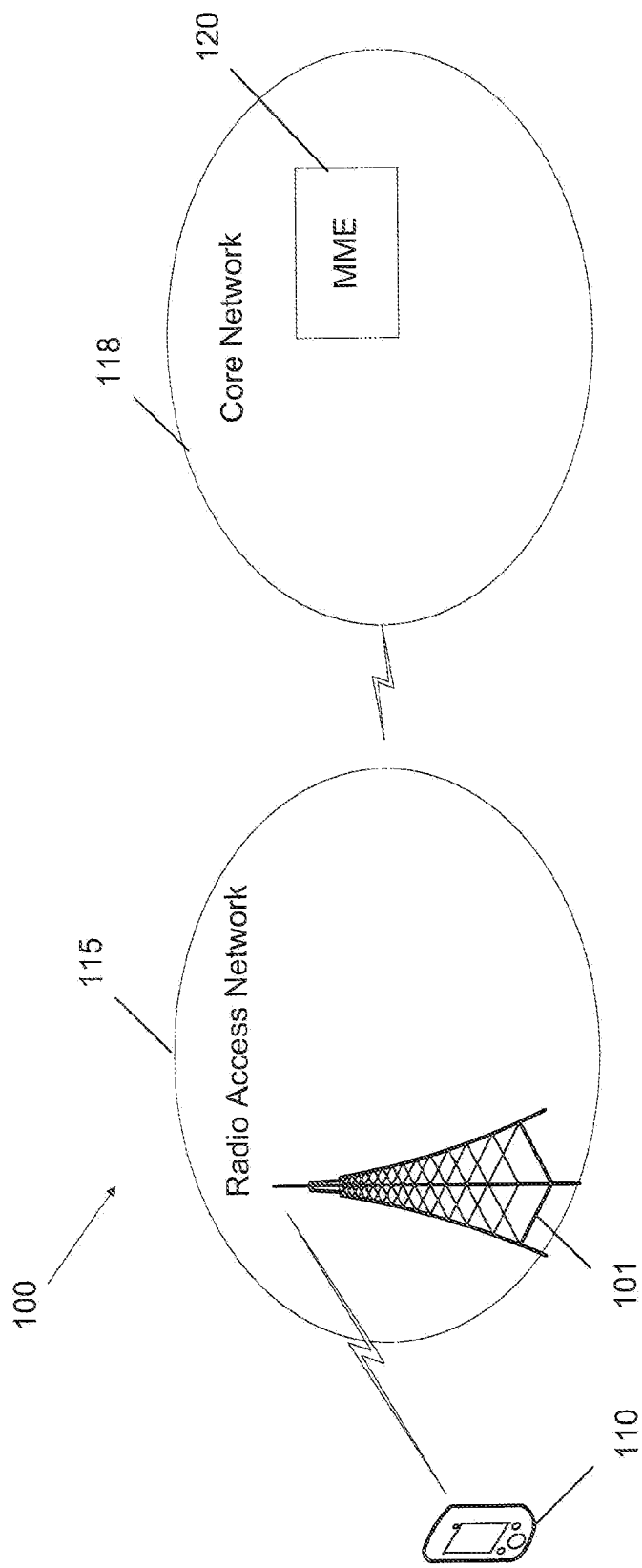
FIG. 1 is a schematic block diagram illustrating embodiments of a wireless communication system.

FIG. 1 shows a schematic view of parts of a wireless communications system 100 in which the embodiments herein are applied. The embodiments herein will be described in the following with terminology from a LTE system, but it should be made clear that this is merely in order to facilitate the reader's understanding of the description, and should be seen as an example only. The embodiments herein may equally well be applied in other types of wireless communications systems, such as for example WCDMA systems and GSM systems.

The system 100 shown in FIG. 1 comprises a node. In some embodiments, the node may serve a cell (not shown). The node may be a network unit capable to directly or indirectly communicate over a radio carrier with a transceiver. The node may be for example a Base Transceiver Station (BTS), a BSC or a Serving General Packet Radio Service Support Node (SGSN) in a GSM system, a NodeB, a RNC or SGSN in a Wideband Code Division Multiple Access (WCDMA) system, an eNodeB or a Mobility Management Entity (MME) in an LTE system. The node is shown by way of example as an LTE eNodeB 101 in FIG. 1.

The transceiver may be a user equipment, for an LTE system, but in other embodiments it may also be a user equipment for a WCDMA system, or a Mobile Station, an MS, for a GSM system. In the following description and in the figures, a user equipment 110 is used as an example. The user equipment 110 is present in the cell. Even though FIG. 1 illustrates only one eNB 101 and only one user equipment 110, a person skilled in the art will understand that the system 100 may comprise a plurality of eNBs 101 and a plurality of user equipments 110.

The user equipment 110 may be any suitable communication device or computational device with communication capabilities capable to communicate with a base station over a radio channel, for instance but not limited to mobile phone, smart phone, Personal Digital Assistant (PDA), laptop, MP3 player or portable DVD player (or similar media content devices), digital camera, or even stationary devices such as a PC. A PC may also be connected via a mobile station as the end station of the broadcasted/multicasted media. The user equipment 110 may also be an embedded communication device in e.g. electronic photo frames, cardiac surveillance equipment, intrusion or other surveillance equipment, weather data monitoring systems, vehicle, car or transport communication equipment, etc. The user equipment 110 is referred to as UE in some of the figures.

The wireless communication system 100 comprises, as mentioned earlier, a radio access network 115 and a core network 118. The radio access network comprises a number of nodes, such as BSC (not shown) and a RNC (not shown). The core network 118 also comprises a plurality of entities, such as for example a MME 120. When a user equipment 110 registers with the core network 118, the MME 120 request subscriber data from a home subscriber server and performs authentication of the user equipment's 110 Subscriber Identity Module (SIM) card. The MME 120 also takes care of signaling to and from the user equipment 110, by means of signaling protocols referred to as Non Access Stratum (NAS) signaling. The MME 120 also takes care of handover signaling when a user equipment 110 moves between two radio access areas or networks.

As mentioned initially, the embodiments herein improve the situation for Machine to Machine applications in wireless communications systems 100, M2M applications for short. The growing use of M2M applications increase the risk of traffic congestion in the systems, especially if, for example, a large number of M2M applications have been programmed by their owners or by the designer of the system to transmit reports at certain points in time.

One way of avoiding such congestion is by recognizing the fact that many M2M applications are not time critical, i.e. that traffic from devices comprising the M2M applications can be handled with low priority. Naturally, an M2M application such as a home alarm system is extremely time critical, while other M2M systems or messages such as, for example, electricity meters which submit their readings, are much less time critical, i.e. they are in other terms "delay tolerant".

In some M2M applications, the traffic may be either delay tolerant or not. For example, the home alarm mentioned previously is not delay tolerant when transmitting an alarm to a central, but is delay tolerant when transmitting readings of meters or other such information. For this reason, a user equipment may be arranged to dynamically indicate in a message if a request for resources is delay tolerant or not.

Figure 2:
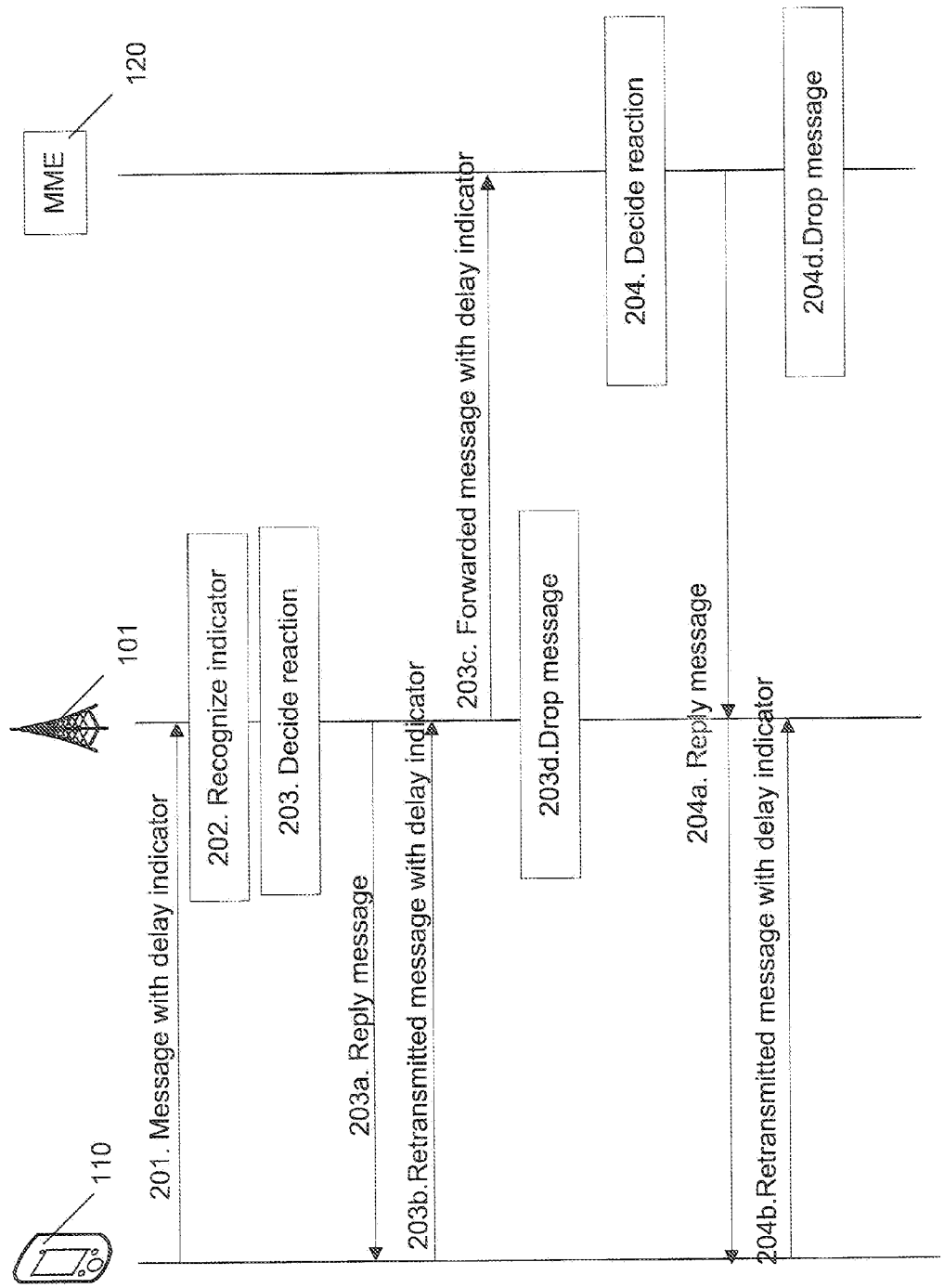
FIG. 2 is a combined signaling diagram and flow chart illustrating embodiments of a method.
Figure 3:
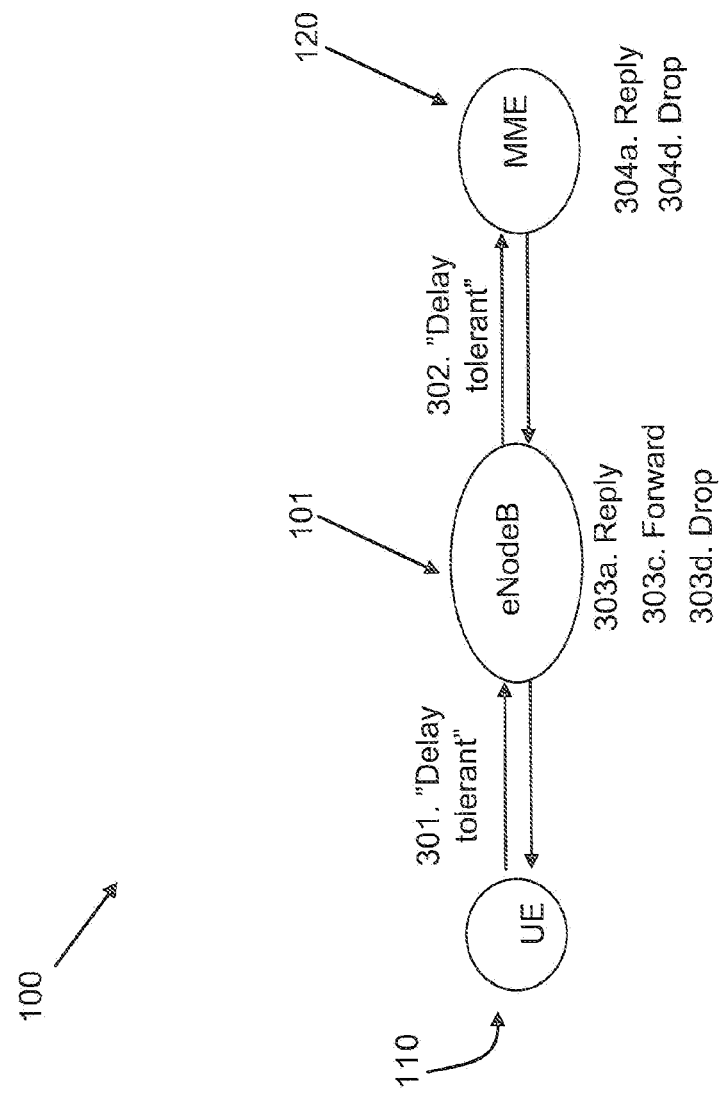
FIG. 3 is a flow chart illustrating embodiments of a method.

The embodiments herein for enabling traffic prioritizing in a wireless communication system 100 according to some embodiments will now be described with reference to the combined signaling diagram and flowchart depicted in FIG. 2 and the flow chart depicted in FIG. 3 illustrating the method, and with reference to FIG. 1 depicting the communication system 100. The method comprises the following steps, which steps may as well be carried out in any suitable order than described below.

Step 201 and Step 301

The user equipment 110 transmits a message to the eNB 101 comprising an indicator indicating that the UE 110 is delay tolerant. The indicator may be a flag, e.g. a low access priority flag. The indicator may also be represented by a numeric value representing the relative priority, i.e. extent of delay tolerance, at the access. For example varying M2M applications, e.g. utility meter versus a health care monitoring device, may have differing delay tolerant characteristics that may be represented in the value sent in the indicator.

The term "delay tolerant" here means that the traffic may tolerate a delay in transmission which exceeds a predefined time limit which is known within the system 100.

The indicator indicates of whether or not traffic from the user equipment 110 is delay tolerant when it attempts to connect to the system 100. In other words, the indicator classifies the user equipment 110 as a delay tolerant device. In some embodiments, the indicator may be signaled in a so called access request message, i.e. a message sent by the user equipment 110 indicating that it wishes to establish a connection to the network 100. In some embodiments, the indicator, i.e. the information that a message, i.e. "payload data", is delay tolerant may be comprised in the message, i.e. "payload data", itself.

The indicator, e.g. the low access priority flag, may be preconfigured locally in the user equipment 110 for example upon production of the user equipment 110 or loaded into the user equipment 110 after production, for example by configuring the indicator in the SIM card associated with the user equipment 110.

In some embodiments, the user equipment 110 may dynamically indicate in a message if the user equipment 110 is delay tolerant or not.

Step 202

The eNB 101 receives the message, and extracts or recognizes the indicator indicating that the user equipment 110 is delay tolerant. Thus, the eNB 101 has information indicating that traffic from the user equipment 110 to the system 100 may tolerate a delay in transmission which exceeds a predefined limit. The predefined limit may for example be 15 minutes or 20 minutes.

Step 203 and 303

Upon receiving the information that the traffic from the user equipment 110 is delay tolerant, the eNodeB 101, may react in a number of ways. The information that the traffic from the user equipment 110 is delay tolerant may be comprised in an indicator or a flag.

Step 203a, 302 and 303a

Step 203a is an embodiment of an alternative of eNB 101 response to the delay tolerant indicator. The eNB 101 may transmit a message to the user equipment 110 in reply to the message received in step 201. The reply indicating that the user equipment 110 should retransmit its message after at least a certain period of time, the period of time being indicated in the reply message.

In one embodiment, in order to ensure that all user equipments 110 will not retransmit their messages, e.g. the access request message or the payload data message, at the same point in time, the eNodeB 120 may transmit a reply message to the user equipment 110 that it should transmit a new message or retransmit the previous message after at least a certain amount of time. This amount of time may be determined randomly in an interval starting from the predefined limit. In other words, if the predefined limit is, for example, 15 minutes, the new message will be transmitted at a random point in time starting in 15 minutes. In one such embodiment, the eNodeB 101 is arranged to let the interval extend to an upper limit which is predefined, so that the random point in time at which the new/retransmitted message is transmitted is between a starting and a finishing point in time, for example starting at 15 minutes "from now" and finishing 2 hours "from now".

Step 203b and 301

In some embodiments, step 203b is performed after step 203a. The user equipment 110 retransmits the message after at least a certain period of time, the period of time being indicated in the reply message.

Step 203c and 302

Step 203c is an embodiment of an alternative of eNB 110 response to the delay tolerant indicator. The eNB 110 may forward the access request message to another node in the system 100. The another node may be in the radio access network 115 or in the core network 118, and may for example be the MME 120, a Base Station Controller or a Radio Network Controller. The MME 120 is used as an example in FIGS. 2 and 3. Other suitable nodes in the radio access network 115 or the core network 118 may also be applicable.

Step 203d and 303d

Step 203d and 303d is an embodiment of an alternative of reaction performed by the eNB 110 in response to the delay tolerant indicator. The eNB 101 may take no further action, i.e. to "drop" the access request message.

Step 204

Step 204 is a step performed after steps 203c, 302 and 303c. The MME 120 receives the forwarded message from the eNB 110, and decides how to react to the received message. Upon receiving the information that the traffic from the user equipment 110 is delay tolerant, the MME 120 may react in a number of ways.

Step 204a, 301, 302, 303a and 304a

Steps 204a and 304a and 303a are an embodiment of an alternative reaction from the MME 120 upon receipt of the information that the traffic from the user equipment 120 is delay tolerant. The MME 120 may transmit a message to the use equipment 110 in reply to the message received in steps 201 and 301 and forwarded in steps 203c and 302 or 303c. The reply message may in some embodiments be transmitted via the eNB 101. The reply indicates that the user equipment 110 should retransmit its message after at least a certain period of time, the period of time being indicated in the reply message.

In one embodiment, in order to ensure that all user equipments 110 will not retransmit their messages, e.g. the access request message or the payload data message, at the same point in time, the MME 120 may transmit a reply message to the user equipment 110 that it should transmit a new message or retransmit the previous message after at least a certain amount of time. This amount of time may be determined randomly in an interval starting from the predefined limit. In other words, if the predefined limit is, for example, 15 minutes, the new message will be transmitted at a random point in time starting in 15 minutes. In one such embodiment, the MME 120 is arranged to let the interval extend to an upper limit which is predefined, so that the random point in time at which the new/retransmitted message is transmitted is between a starting and a finishing point in time, for example starting at 15 minutes "from now" and finishing 2 hours "from now".

Step 204b and 301

In some embodiments, step 204b is performed after step 204a. The user equipment 110 retransmits the message after at least a certain period of time, the period of time being indicated in the reply message.

Step 204d and 304d

In some embodiments, steps 204d and 304d is an alternative reaction from the MME 120 upon receipt of the information that the traffic from the user equipment 120 is delay tolerant, i.e. that the user equipment 120 is a delay tolerant device. The MME 120 may take no further action, i.e. it "drops" the message, .e.g. the access request message.

Figure 4:
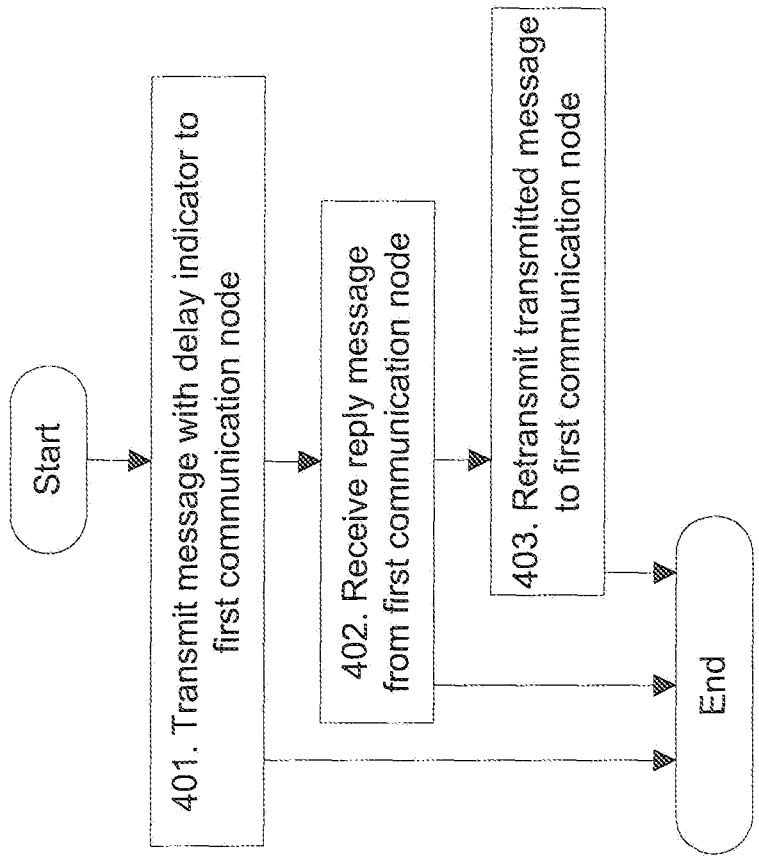
FIG. 4 is a flow chart illustrating embodiments of a method in a transceiver.

The method described above will now be described seen from the perspective of the transceiver 110. FIG. 4 is a flowchart describing the present method in the transceiver 110 for enabling traffic prioritizing in a wireless communication system 100. The transceiver 110 is configured to transmit traffic to a first communication node 101, 120. The MME 120 may act as a first communication node e.g. when a delay tolerant indicator e.g. a low access priority flag, is passed in a non-access stratum (NAS) protocol layer transparently through an eNB 101. In some embodiments, the transceiver 110 is a user equipment and the first communication node 101, 120 is an eNode B. In some embodiments, the first communication node 101, 120 is a mobility management node, such as a MME. The method comprises the following steps to be performed by the transceiver 110:

Step 401

This step corresponds to steps 201, 203c, 301 and 302 in FIGS. 2 and 3.

The transceiver 110 transmits a message to the first communication node 101, 120. The message comprises an indicator indicating that the transmitted traffic tolerates a delay.

In some embodiments, the transmitted traffic tolerates a delay which exceeds a limit. The limit may be predetermined in the transceiver 110

In some embodiments, the indicator is predefined in the transceiver 110 or obtained from a third communication node (not shown). In some embodiments, the third communication node may be an operator, a MME 120, a home subscriber server (HSS) or any suitable node comprised in the system 100. In some embodiments, the indicator is dynamically obtained from the third communication node.

Step 402

This step corresponds to step 203a in FIG. 2 and step 303a and 304a in FIG. 3.

In some embodiments, the transceiver 110 receives a reply message from the first communication node 101, 120 in reply to said transmitted message. The reply message indicates retransmission of the transmitted message, and that the retransmission should be performed after a time period from the transmission of the transmitted message. The time period is indicated in the reply message.

In some embodiments, the time period is determined in an interval starting from the limit. The limit refers to the delay limit which the delay tolerant traffic exceeds, as mentioned in step 401. In some embodiments, the time is determined randomly in the interval.

Step 403

This step corresponds to step 203b in FIG. 2 and step 301 and 302 in FIG. 3.

In some embodiments, this step 403 is performed after step 402. The transceiver 110 may retransmit the transmitted message to the first communication node 101, 120 after the time period.

Figure 5:
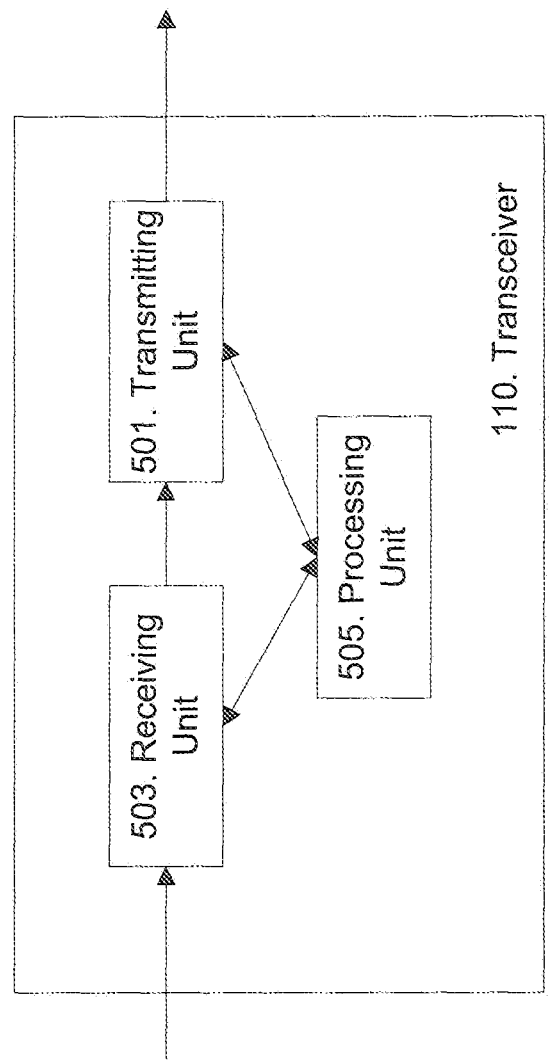
FIG. 5 is a block diagram illustrating embodiments of a transceiver.

To perform the method steps shown in FIG. 4 for enabling traffic prioritizing a wireless communications system 100, the transceiver 110 comprises a transceiver arrangement as shown in FIG. 5. The transceiver 110 comprises a transmitting unit 501 configured to transmit traffic to a first communication node 101, 120, and to transmit a message to the first communication node 101, 120. The message comprises an indicator indicating that the transmitted traffic tolerates a delay, enabling traffic prioritizing in the wireless communication system 100. In some embodiments, the transmitted traffic tolerates a delay which exceeds a limit. In some embodiments, the indicator is predefined in the transceiver 110 or obtained from a third communication node. In some embodiments, the third communication node may be an operator, a MME 120, a home subscriber server (HSS) or any suitable node comprised in the system 100. In some embodiments, the indicator dynamically obtained from the third communication node 120.

In some embodiments, the transceiver 110 is a user equipment and the first communication node 101, 120 is an eNode B. In some embodiments, the first communication node 101, 120 is a mobility management node.

In some embodiments, the transceiver 110 comprises a receiving unit 503 configured to receive a reply message from the first communication node 101 in reply to said transmitted message. The reply message indicates retransmission of the transmitted message. The retransmission is to be performed after a time period from the transmission of the transmitted message. The time period is indicated in the reply message.

In some embodiments, the transmitting unit 501 is further configured to retransmit the transmitted message to the first communication node 101, 120 after the time period. In some embodiments the time period is determined in an interval starting from the limit. In some embodiments, the time is determined randomly in the interval.

Figure 6:
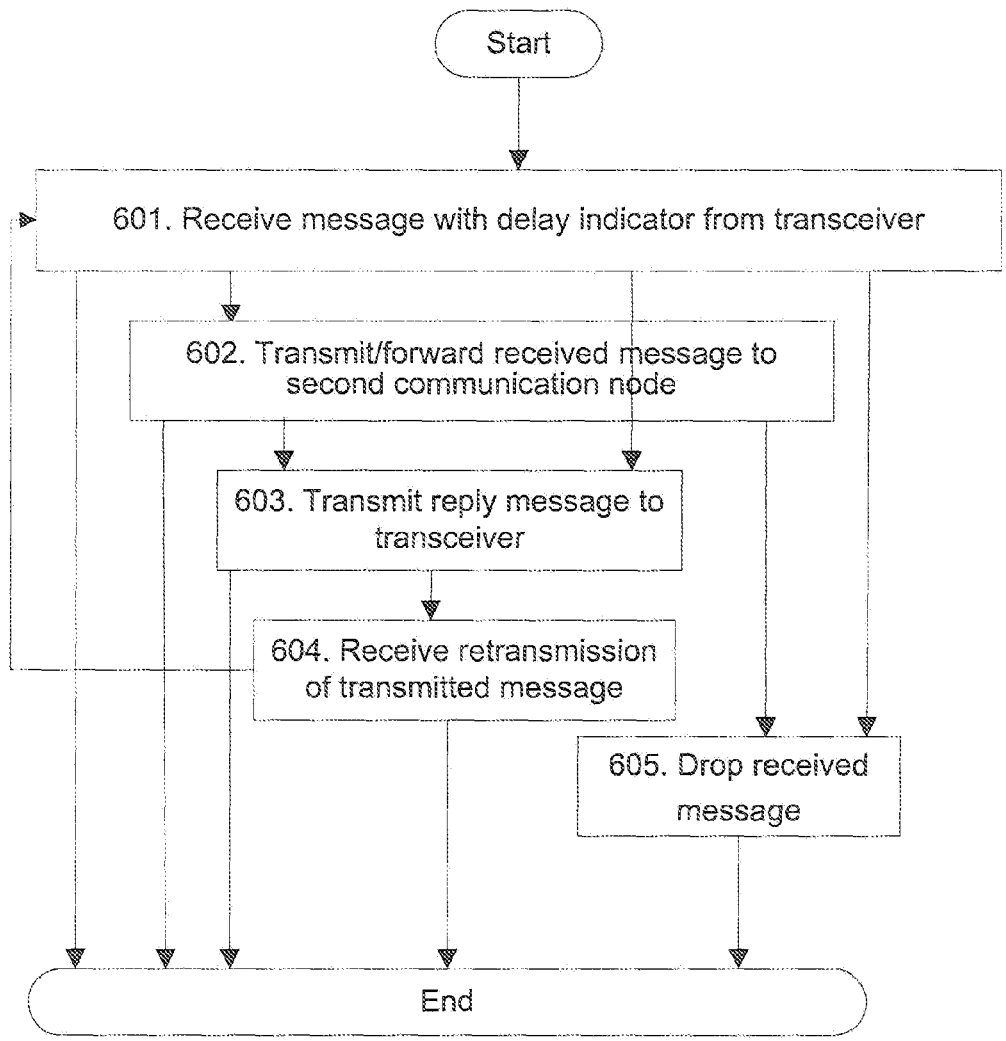
FIG. 6 is a flow chart illustrating embodiments of a method in a first communication node.

The method described above will now be described seen from the perspective of the first communication node 101, 120. FIG. 6 is a flowchart describing the present method in the first communication node 101, 120 for enabling traffic prioritizing in a wireless communications system 100. As mentioned above, the first communication node 101, 120 is configured to receive traffic from a transceiver 110. In some embodiments, the transceiver 110 is a user equipment. The method comprises the steps to be performed by the first communication node 101, 120.

Step 601

This step corresponds to steps 201 and 202 in FIG. 2 and steps 301 and 302 in FIG. 3.

The first communication node 101, 120 receives a message from the transceiver 110. The message comprises an indicator indicating that the received traffic tolerates a delay, enabling traffic prioritizing in the wireless communication system 100.

Step 602

This step corresponds to steps 203c in FIG. 2, and steps 302 and 303c in FIG. 3.

In some embodiments, the first communication node 101 transmits or forwards the received message to a second communication node 120. The second communication node 120 may be a mobility management node, such as for example a Mobility Management Entity (MME).

Step 603

This step corresponds to steps 203a and 204a in FIG. 2 and steps 301 and 302 in FIG. 3.

Step 603 may be performed after step 602 or as an alternative to step 602, i.e. instead of step 602. In some embodiments, the first communication node 101, 120 transmits a reply message to the transceiver 110 in reply to said transmitted message. The reply message indicates retransmission of the transmitted message. The retransmission takes place after a time period from the transmission of the transmitted message. The time period is indicated in the reply message.

In some embodiments, step 603 is performed after step 602. Then, transmission of the reply message to the transceiver 110 is a forwarding of the reply message from the second communication node 120.

Step 604

This step corresponds to steps 203b and 204b FIG. 2 and steps 301 and 302 in FIG. 3.

In some embodiments, step 604 is performed after step 603. The first communication node 101, 120 may receive a retransmission of the transmitted message from the transceiver 110 after the time period. The method then commences from step 601 again.

Step 605

This step corresponds to steps 203d and 204d in FIG. 2 and steps 303d and 304d in FIG. 3.

In some embodiments, step 605 is performed after step 602 or as an alternative to steps 602, 603 and 604. The first communication node 101, 120 may drop the received message.

In some embodiments, first communication node is an eNodeB 101 and the second communication node is a mobility management node, such as a Mobility Management Entity (MME) 120. In some embodiments the first communication node is a mobility management node, such as a Mobility Management Entity (MME) 120.

Figure 7:
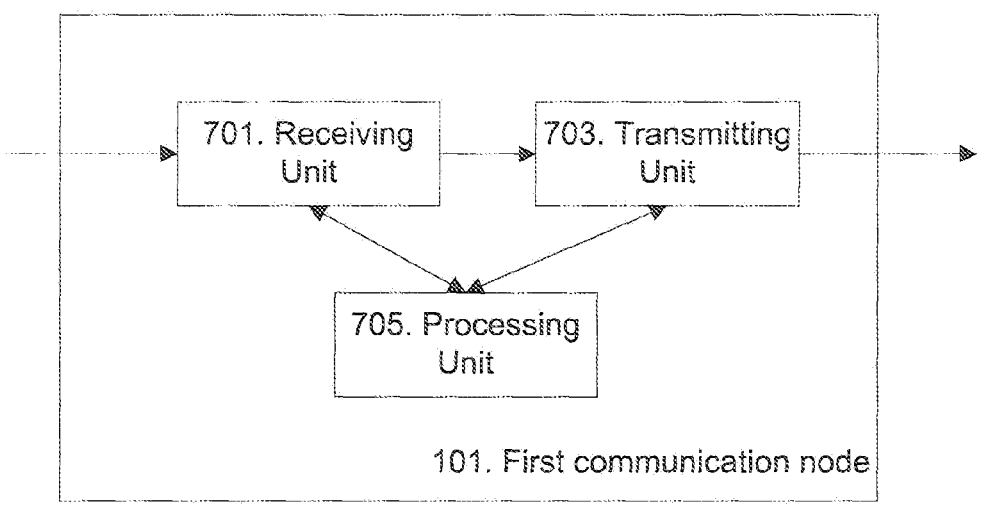
FIG. 7 is a block diagram illustrating embodiments of a first communication node.

To perform the method steps shown in FIG. 6 for enabling traffic prioritizing in a wireless communication system 100 the first communication node 101 comprises a first communication node arrangement as shown in FIG. 7. As mentioned above, the first communication node 101, 120 is configured to receive traffic from a transceiver 110. The first communication node 101, 120 comprises a receiving unit 701 configured to receive a message from the transceiver 110. The message comprises an indicator indicating that the received traffic tolerates a delay, enabling traffic prioritizing in the wireless communication system 100. In some embodiments, the receiving unit 701 is further configured to receive a retransmission of the transmitted message from the transceiver 110 after the time period.

In some embodiments, the first communication node further comprises a transmitting unit 703 configured to transmit a reply message to the transceiver 110 in reply to said transmitted message. The reply message indicates retransmission of the transmitted message after a time period from the transmission of the transmitted message. The time period is indicated in the reply message. In some embodiments, the transmitting unit 703 is further configured to transmit the received message to a second communication node 120.

In some embodiments, the transmitting unit 703 or the receiving unit 701 is further configured to drop the received message, depending on internal state e.g. congestion or overload or other traffic prioritization in the first communication node 101.

The embodiments herein for enabling traffic prioritizing in a wireless communication system 100 may be implemented through one or more processors, such as a processor 505 in the transceiver arrangement depicted in FIG. 5 and a processor 705 in the first communication node arrangement depicted in FIG. 7, together with computer program code for performing the functions of the embodiments herein. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the embodiments herein when being loaded into the transceiver 110 and/or the first communication node 101, 120. One such carrier may be in the form of a CD ROM disc. It is however feasible with other data carriers such as a memory stick. The computer program code can furthermore be provided as pure program code on a server and downloaded to the transceiver 110 and/or first communication node 101, 120 remotely.

The embodiments herein are not limited to the above described preferred embodiments. Various alternatives, modifications and equivalents may be used. Therefore, the above embodiments should not be taken as limiting the scope of the embodiments herein, which is defined by the appended claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods defined in the appended claims may, without departing from the embodiments herein, be performed in another order than the order in which they appear in the claims.

The embodiments herein are not limited to the examples of embodiments described above and shown in the drawings, but may be freely varied within the scope of the appended claims.

The invention claimed is:

1. A method in a transceiver for enabling machine to machine (M2M) traffic prioritizing in a wireless communication system, the transceiver being configured to transmit M2M traffic to a first communication node, the method comprising:
   transmitting a message to the first communication node, the message comprising an indicator indicating that the transmitted M2M traffic tolerates a delay, wherein the message is a request to establish a connection to the wireless communication system, enabling M2M traffic prioritizing in the wireless communication system,
   receiving a reply message from the first communication node in reply to said transmitted message, the reply message indicating retransmission of the transmitted message after a time period from the transmission of the transmitted message, the time period being indicated in the reply message; and
   retransmitting the transmitted message to the first communication node after the time period;
   wherein the transmitted M2M traffic tolerates the delay which exceeds a limit, and wherein the time period is determined in an interval starting from the limit.

2. The method according to claim 1, wherein the indicator is predefined in the transceiver or obtained from a third communication node.

3. The method according to claim 1, wherein the transceiver is a user equipment and the first communication node is an eNode B, or wherein the transceiver is a user equipment and the first communication node is a mobility management node.

4. A method in a first communication node for enabling machine to machine (M2M) traffic prioritizing in a wireless communications system, the first communication node being configured to receive M2M traffic from a transceiver, the method comprising:
receiving a message from the transceiver, the message comprising an indicator indicating that the received M2M traffic tolerates a delay, enabling traffic prioritizing in the wireless communication system, wherein the message is a request to establish a connection to the wireless communication system;
transmitting a reply message to the transceiver in reply to said transmitted message, the reply message indicating retransmission of the transmitted message after a time period from the transmission of the transmitted message, which time period being indicated in the reply message; and
receiving a retransmission of the transmitted message from the transceiver after the time period;
wherein the transmitted M2M traffic tolerates the delay which exceeds the limit, and wherein the time period is determined in an interval starting from the limit.

5. The method according to claim 4, further comprising transmitting the received message to a second communication node.

6. The method according to claim 4, further comprising dropping the received message.

7. A transceiver for enabling machine to machine (M2M) traffic prioritizing a wireless communications system, the transceiver comprising:
a transmitting unit configured to
transmit M2M traffic to a first communication node, and to
transmit a message to the first communication node, the message comprising an indicator indicating that the transmitted M2M traffic tolerates a delay, wherein the message is a request to establish a connection to the wireless communication system, enabling M2M traffic prioritizing in the wireless communication system;
a receiving unit configured to receive a reply message from the first communication node in reply to said transmitted message, the reply message indicating retransmission of the transmitted message after a time period from the transmission of the transmitted message, which time period being indicated in the reply message; and
wherein the transmitting unit is further configured to retransmit the transmitted message to the first communication node after the time period;
wherein the transmitted M2M traffic tolerates the delay which exceeds the limit, and wherein the time period is determined in an interval starting from the limit.

8. A first communication node for enabling machine to machine (M2M) traffic prioritizing in a wireless communication system, the first communication node is configured to receive M2M traffic from a transceiver, the first communication node comprising:
a receiving unit configured to receive a message from the transceiver, the message comprising an indicator indicating that the received M2M traffic tolerates a delay, wherein the message is a request to establish a connection to the wireless communication system, enabling M2M traffic prioritizing in the wireless communication system,
a transmitting unit configured to transmit a reply message to the transceiver in reply to said transmitted message, the reply message indicating retransmission of the transmitted message after a time period from the transmission of the transmitted message, which time period being indicated in the reply message; and
wherein the receiving unit is further configured to receive a retransmission of the transmitted message from the transceiver after the time period;
wherein the transmitted M2M traffic tolerates the delay which exceeds the limit, and wherein the time period is determined in an interval starting from the limit.

* * * * *

UNITED STATES PATENT AND TRADEMARK OFFICE
CERTIFICATE OF CORRECTION

PATENT NO. : 8,675,489 B2
APPLICATION NO. : 12/981725
DATED : March 18, 2014
INVENTOR(S) : Ronneke et al.

It is certified that error appears in the above-identified patent and that said Letters Patent is hereby corrected as shown below:

On the Title Page

Item (57), under "ABSTRACT", in Column 2, Line 2, delete "you".

In the Specification

In Column 2, Line 3, delete "intervention" and insert -- intervention. --, therefor.

In Column 5, Line 35, delete "network 100." and insert -- network 115. --, therefor.

In Column 6, Line 7, delete "eNodeB 120" and insert -- eNodeB 101 --, therefor.

In Column 6, Line 27, delete "eNB 110" and insert -- eNB 101 --, therefor.

In Column 6, Line 28, delete "eNB 110" and insert -- eNB 101 --, therefor.

In Column 6, Line 38, delete "eNB 110" and insert -- eNB 101 --, therefor.

In Column 6, Line 43-44, delete "eNB 110," and insert -- eNB 101, --, therefor.

In Column 6, Line 51, delete "equipment 120" and insert -- equipment 110 --, therefor.

In Column 7, Line 18, delete "equipment 120" and insert -- equipment 110 --, therefor.

In Column 7, Line 19, delete "equipment 120 is" and insert -- equipment 110 is --, therefor.

In Column 7, Line 45, delete "transceiver 110" and insert -- transceiver 110. --, therefor.

Signed and Sealed this
Eighth Day of July, 2014

Michelle K. Lee
*Deputy Director of the United States Patent and Trademark Office*

CERTIFICATE OF CORRECTION (continued)
U.S. Pat. No. 8,675,489 B2

In the Claims

In Column 11, Line 24, in Claim 4, delete "the limit," and insert -- a limit, --, therefor.

In Column 12, Line 14, in Claim 7, delete "the limit," and insert -- a limit, --, therefor.

In Column 12, Line 22, in Claim 8, delete "themessage" and insert -- the message --, therefor.

In Column 12, Line 38, in Claim 8, delete "the limit," and insert -- a limit, --, therefor.